United States Patent
Krings

(10) Patent No.: US 11,353,065 B2
(45) Date of Patent: Jun. 7, 2022

(54) CONSTANT VELOCITY BALL JOINT WITH MULTIPLE-BALL CAGE WINDOW

(71) Applicant: NEAPCO INTELLECTUAL PROPERTY HOLDINGS, LLC, Farmington Hills, MI (US)

(72) Inventor: Dominik Krings, Heimbach (DE)

(73) Assignee: NEAPCO INTELLECTUAL PROPERTY HOLDINGS, LLC., Farmington Hills, MI (US)

( * ) Notice: Subject to any disclaimer, the term of this patent is extended or adjusted under 35 U.S.C. 154(b) by 334 days.

(21) Appl. No.: 16/664,962

(22) Filed: Oct. 28, 2019

(65) Prior Publication Data
US 2020/0132128 A1   Apr. 30, 2020

(30) Foreign Application Priority Data
Oct. 29, 2018  (DE) ..................... 10 2018 126 976.5

(51) Int. Cl.
*F16D 3/223* (2011.01)

(52) U.S. Cl.
CPC .... *F16D 3/223* (2013.01); *F16D 2003/22303* (2013.01); *F16D 2003/22306* (2013.01); *F16D 2003/22309* (2013.01)

(58) Field of Classification Search
CPC ........... F16D 3/223; F16D 2003/22303; F16D 2003/22306; F16D 2003/22309
USPC ...................................................... 464/145
See application file for complete search history.

(56) References Cited

U.S. PATENT DOCUMENTS

| | | | |
|---|---|---|---|
| 6,478,683 B1* | 11/2002 | Ouchi | F16D 3/2245 464/145 |
| 7,407,441 B2* | 8/2008 | Matsumoto | F16D 3/2237 464/145 |
| 7,544,132 B2* | 6/2009 | Schaaf | F16D 3/223 464/145 |
| 2001/0021671 A1 | 9/2001 | Ouchi et al. | |

(Continued)

FOREIGN PATENT DOCUMENTS

| | | |
|---|---|---|
| CN | 107327508 A | 11/2017 |
| DE | 10 2004 018 777 A1 | 3/2005 |
| KR | 10-2018-0071707 A | 6/2018 |

OTHER PUBLICATIONS

Universal Joint and Driveshaft Design Manual, AE-7, Society of Automotive Engineers, Inc., Warendale, PA, Section 3.2.1, TJ1079. S62. (Year: 1979).*

*Primary Examiner* — Greg Binda
(74) *Attorney, Agent, or Firm* — Norman B. Thot

(57) ABSTRACT

A constant velocity joint includes an outer joint portion with a first longitudinal axis, a first attaching end, an aperture end and outer ball tracks on an inner circumferential surface, an inner joint portion with a second longitudinal axis, a second attaching end, an inner face facing towards the outer joint portion and inner ball tracks on its outer circumferential surface, balls for torque transmission between the outer and inner joint portions, an annular ball cage between the outer and inner joint portions with several cage windows in which the balls are guided. The inner and outer joint portions are arranged so that one outer ball track and one inner ball track are in each case arranged opposite to each other to form three different types of track pairs to receive one respective balls. The balls have different controlling behaviors due to different track geometries.

13 Claims, 7 Drawing Sheets

(56) References Cited

U.S. PATENT DOCUMENTS

| | | |
|---|---|---|
| 2004/0072622 A1 | 4/2004 | Hassenrik et al. |
| 2004/0116192 A1 | 6/2004 | Krude et al. |
| 2004/0137991 A1 | 7/2004 | Weckerling |
| 2007/0111806 A1 | 5/2007 | Weckerling |
| 2014/0329608 A1 | 11/2014 | Yamazaki et al. |
| 2018/0119744 A1 | 5/2018 | Kim |

* cited by examiner

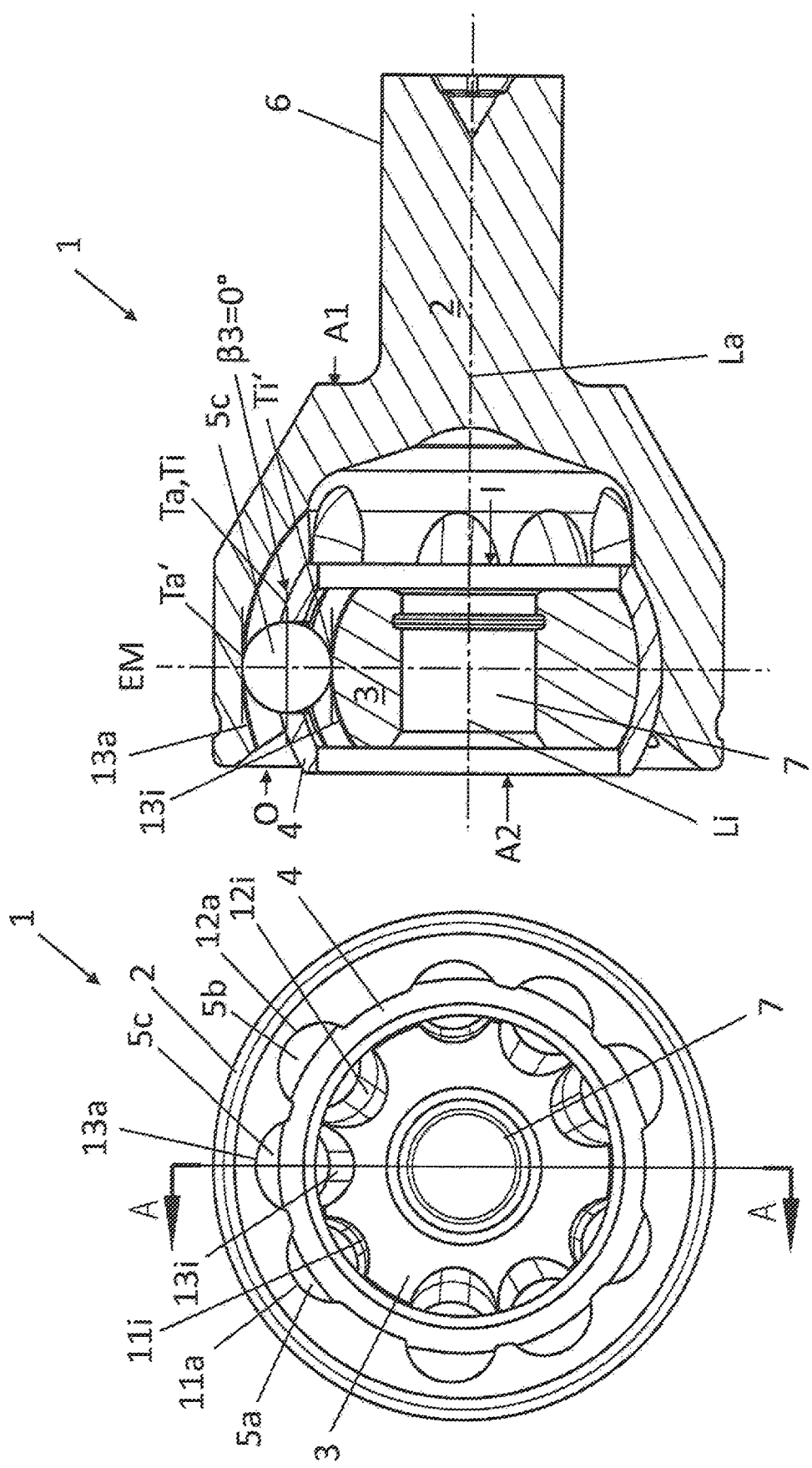

CONSTANT VELOCITY BALL JOINT WITH MULTIPLE-BALL CAGE WINDOW

CROSS REFERENCE TO PRIOR APPLICATIONS

Priority is claimed to German Patent Application No. DE 10 2018 126 976.5, filed Oct. 29, 2018. The entire disclosure of said application is incorporated by reference herein.

FIELD

The present invention relates to a constant velocity ball joint, which is hereinafter also referred to as a constant velocity joint or just simply joint.

BACKGROUND

Such a joint typically has the following features: an outer joint portion is provided, which has a first longitudinal axis and, situated axially opposite to each other, a first attaching end and an aperture end. Relative to the joint, outer ball tracks are formed on its inner circumferential surface. The joint further includes an inner joint portion, which has a second longitudinal axis and, situated axially opposite to each other, a second attaching end and an inner face facing towards the outer joint portion. The first and second attaching ends respectively serve for the accommodation and/or non-rotatable connection with a shaft facing towards the joint or a hub, for example, a wheel hub of a motor vehicle. The joint typically includes several balls for torque transmission between the inner joint portion and the outer joint portion. The outer joint portion and the inner joint portion are disposed so that, in each case, one of the inner ball tracks and one of the outer ball tracks are located one opposite the other in pairs, wherein one ball is respectively accommodated between them. An annular ball cage disposed between the inner joint portion and the outer joint portion is provided for guiding the balls. The ball cage has several cage windows (which are also referred to, in short, as windows) which are distributed in the circumferential direction and in which one ball, respectively, is typically accommodated. The ball cage serves for guiding the balls in the ball tracks, wherein the balls roll along a center line described by a center of the respective ball and defined in each case by the course of the associated ball tracks, an outer and an inner center line, and, guided by the cage, are located at the intersection of these two center lines depending on the position of the joint, so that, when the joint is straightened, the centers of the balls are guided by the ball cage in a common joint center plane, which, when the joint is straightened, is perpendicular to the first and second longitudinal axes and, when the joint is bent, corresponds to an angle-bisecting plane between the first and second longitudinal axes. In this case, if the joint is bent, the ball runs in each case along an outer contact line in the outer ball track, forming an outer ball contact point, and along an inner contact line in the inner ball track, forming an inner ball contact point. The inner and outer contact lines extend parallel to the center lines, which in each case intersect at the location of the center of the ball in the joint center plane, which is dependent on the position of the joint. The tangents to the outer center line and the tangent to the inner center line in the intersection point with the joint center plane include an opening angle. Joints are known in which this angle opens from the first attaching end towards the aperture end for the one part of the track pairs, and towards the opposite direction for another part of the track pairs, such as is described, for example, in DE 100 60 119 A1.

In the joints described in DE 100 60 119 A1, which are referred to as counter track joints, the forces acting on the balls act in axially opposite directions due to the opposite openings of the opening angles. These forces are borne by the cage, which is therefore subjected to a resulting axial force becoming zero. The case is therefore supported, substantially free from axial forces, in the outer joint portion, so that the joint is characterized by low friction and thus by smooth running and a high degree of efficiency. This type of joint is disadvantageous in that the ball located in this type of track has a comparatively small degree of contact, which decreases particularly as the joint is increasingly bent. The degree of contact or angle of contact of the torque-transmitting balls is the angular range in which the ball is enclosed by the associated circulation track, and decreases in the critical border areas of these ball circulation tracks, which results in a higher contact pressure, and thus in a higher risk of the material breaking. This can be countered only to a limited extent by so-called offset correction or an adaptation of the track transverse form. These corrections are at the least detrimental with respect to the structural volume.

SUMMARY

An aspect of the present invention is to provide a constant velocity ball joint (or a constant velocity joint in short) in which the ratio of the torque transmission to the structural volume is increased, and which is improved particularly with respect to the smooth running and the degree of efficiency.

In an embodiment, the present invention provides a constant velocity joint which includes an outer joint portion, an inner joint portion, a plurality of balls and an annular ball cage. The outer joint portion comprises a first longitudinal axis, a first attaching end, an aperture end, and outer ball tracks which are arranged on an inner circumferential surface. The first attaching end and the aperture end are arranged axially opposite to each other. The inner joint portion comprises a second longitudinal axis, a second attaching end, an inner face which is arranged to face towards the outer joint portion, and inner ball tracks which are arranged on an outer circumferential surface. The second attaching end and the inner face are arranged axially opposite to each other. The plurality of balls transmit torque between the outer joint portion and the inner joint portion. The annular ball cage is arranged between the inner joint portion and the outer joint portion. The annular ball cage comprises cage windows which are arranged in a circumferential direction. The plurality of balls are guided in the cage windows. The inner joint portion and the outer joint portion are arranged so that one of the outer ball tracks and one of the inner ball tracks are in each case arranged opposite to each other so as to form three different types of track pairs comprising a first type of track pair, a second type of track pair, and a third type of track pair, each of which are configured to receive one of the plurality of balls. When the constant velocity joint is bent, the plurality of balls each run along an outer center line prescribed by the respectively associated outer ball track and defined by a center of a respective ball of the plurality of balls and along an inner center line prescribed by the respectively associated inner ball track and defined by the center of the respective ball of the plurality of balls. The plurality of balls are guided by the annular ball cage so that, when the constant velocity joint is straightened, the respective centers of the plurality of balls are guided by the annular ball cage in a common joint center plane which, when the constant velocity joint is straightened, is perpendicular to the first longitudinal axis and to the second longitudinal axis and, when the constant velocity joint is bent, corresponds to an angle-bisecting plane between the first longitudinal axis and to the second longitudinal axis. A position of the constant velocity joint creates an opening angle which is defined by an outer tangent to the outer center line in an intersection point thereof with the joint center plane and by an inner tangent to the inner center line in the intersection point thereof with the joint center plane. At least in a straightened position of the constant velocity joint, the opening angle for the first type of the track pairs opens toward the first attaching end, the opening angle for the second type of the track pairs opens toward the aperture end, and the opening angle for the third type of the track pairs is less than each of the opening angle for the first type of track pairs and the opening angle for second type of track pairs. The annular ball cage comprises at least one cage window in which are arranged together at least one ball of the plurality of balls associated with the first type of track pairs, at least one ball of the plurality of balls associated with the second type of track pairs, and at least one ball of the plurality of balls associated with the third type of track pairs.

BRIEF DESCRIPTION OF THE DRAWINGS

The present invention is described in greater detail below on the basis of embodiments and of the drawings in which:

FIG. 1 shows a view onto the aperture end O of an embodiment of the constant velocity joint 1 according to the present invention in the straightened position;

FIG. 2 shows a sectional view of the embodiment from FIG. 1 along the line of cut A-A from FIG. 1;

DETAILED DESCRIPTION

Figures 3, 4:
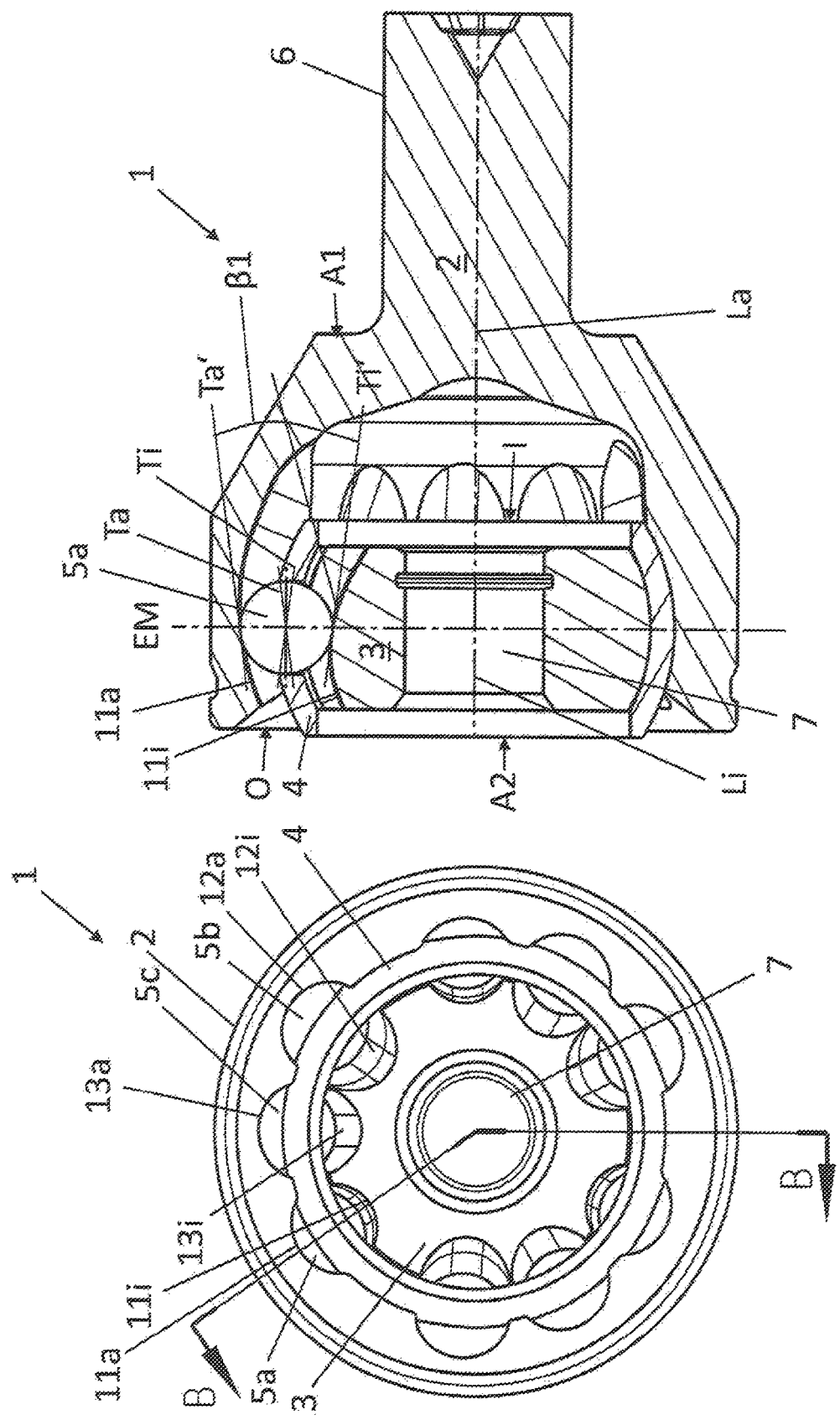
FIG. 3 shows a view corresponding to FIG. 1 with the labeled line of cut B-B.
FIG. 4 shows a sectional view of the embodiment from FIG. 1 along the line of cut B-B from FIG. 3.

The constant velocity joint comprises a, usually cup-shaped, outer joint portion, which has a first longitudinal axis and, situated axially opposite to each other, a first attaching end and an aperture end, and which has outer ball tracks on its inner circumferential surface. For example, the attaching end is configured as a shaft journal or for accommodating a shaft journal. The constant velocity joint further includes an inner joint portion, which has a second longitudinal axis and, situated axially opposite to each other, a second attaching end and an inner face facing towards the outer joint portion, and which has inner ball tracks on its outer circumferential surface. The inner joint portion is usually inserted into the hollow volume formed by the outer joint portion. According to the present invention, several balls are provided for torque transmission between the outer joint portion and the inner joint portion. These are balls which can, for example, have identical dimensions. An annular ball cage is also provided according to the present invention which is disposed between the inner joint portion and the outer joint portion, with several cage windows distributed in a circumferential direction, in which the balls are guided.

According to the present invention, the inner joint portion and the outer joint portion are disposed so that one outer ball track of the outer joint portion and one inner ball track of the inner joint portion are in each case located opposite to each other, forming three different types of track pairs, wherein one of the balls is accommodated in each track pairing. In this case, if the joint is bent, the ball runs in each case along one or several outer contact lines in the outer ball track, and along one or more inner contact lines in the inner ball track. The ball contact line, which is hereinafter also referred to in short as contact line, can in this case extend along the respective track bottom, but also along the two flanks or one of the flanks. The cross section of the tracks can, for example, be gothic, elliptical or correspond to a partial circle. The extent of reciprocating movement executed by the balls is dependent on the degree of bending of the joint. The movement carried out by the balls will hereinafter be described based on the center line describing the rolling movement of the ball center of a ball respectively rolling on the respective ball track, and thus, neglecting a required clearance for the balls, the statements regarding the respective center line apply, mutatis mutandis, to the contact line.

According to the present invention, reference is therefore made to an outer and to an inner center line, which ultimately reflect the rolling behavior of the balls determined by the geometry of the ball track. During torque transmission, the balls are guided in the ball cage, which is also referred to in short as a cage, so that, when the joint is straightened, the centers of the balls are guided by the ball cage in a common joint center plane (EM), which, when the joint is straightened, is perpendicular to the first and second longitudinal axes and, when the joint is bent, corresponds to an angle-bisecting plane between the first and second longitudinal axes.

For each position of the ball along the two ball tracks that can be assumed when the joint is rotating, which is ultimately dependent on the extent of bending of the joint, one opening angle is defined in each case, which is included by an outer tangent to the outer center line in the intersection point of the latter with the joint center plane and an inner tangent to the inner center line in the intersection point of the latter with the joint center plane.

According to the present invention, at least in the straightened position of the joint, it is provided that, for a first type of the track pairs, the opening angle of the straightened position of the joint opens toward the first attaching end, for a second type of the track pairs, the opening angle of the straightened position of the joint opens toward the aperture end, and for a third type of the track pairs, the opening angle of the straightened position of the joint is smaller in absolute value than the opening angles of the straightened position associated with the first and second types.

The insufficient degree of contact and the low mechanical stability of the track pairing of the first and second types in the bent state of the joint can thus be compensated by the third type of track pairs. According to the present invention, at least one cage window is provided in the ball cage, which is referred to as a multiple-ball cage window, and in which at least one ball associated with the first type of track pairs, at least one ball associated with the second type of track pairs, and at least one ball associated with the first type of track pairs, are arranged together, in order to thus save structural volume. On the whole, the ratio of torque transmission capacity and construction space can thus be maximized. The accommodation of several balls in a cage window reduces friction and increases the degree of efficiency because, compared with an arrangement of each ball in an individual window, not every ball of the joint is in contact in several directions with the cage with the surfaces delimiting the window. The integration of at least three balls into one multiple-ball cage window additionally minimizes friction and improves the degree of efficiency because the inner balls located in the window have a smaller number of contacts with the cage. Only the outer balls of the multiple-ball cage window come into contact with the webs delimiting the respective multiple-ball cage window in the circumferential direction of the cage.

In an embodiment of the present invention, every cage window of the cage can, for example, be a multiple-ball cage window. The total number of balls can, for example, correspond to an integer multiple of an integer greater than two. The total number of balls can, for example, correspond to an integer multiple of three, for example, 9.

In order to save structural volume and to maintain a sufficient minimum stability of the cage, the angular distance in the circumferential direction between most closely adjacent balls of the multiple-ball cage window that is the largest possible for all bent positions is smaller than the angular distance of the outermost ball of the multiple-ball cage window from the circumferentially most closely adjacent ball outside the respective multiple-ball cage window. In other words, moving the balls closer together within the multiple-ball cage window leaves space for a sufficient web width with regard to the webs of the cage remaining between the multiple-ball cage windows in the circumferential direction. The balls can, for example, be dimensioned and the arrangement of the inner and outer tracks can, for example, be selected so that the centers of the outer balls of the multiple-ball cage windows are disposed within an arc length associated with the angle of 40°, for example, 34°.

In an embodiment of the present invention, it is provided that, neglecting the clearance between the movable joint partners required in practice, the outer or inner center lines within the track pairs associated with one type can, for example, be mutually congruent.

The orientation of the center line with respect to the associated longitudinal axis may be different. An oblique positioning of the center line relative to the longitudinal axis is conceivable, wherein the oblique positioning of the inner center lines is, for example, opposite to that of the outer center lines, so that the joint could qualify as belonging to the cross groove joint type. However, the center lines can, for example, in each case be disposed in radial planes, i.e., the outer center lines in one radial plane of the first longitudinal axis, and the inner center lines in each case in a different radial plane of the second longitudinal axis.

The present invention is not limited with respect to the specific configuration of the center lines and thus of the contact lines. Over its course, the center line can in each case be described by a circle equation, or in some portions by different circle equations with a continuous transition. Arbitrarily curved courses or even combinations of curved portions with rectilinear courses of the center lines are in principle conceivable. The course of the center line can, for example, be S-shaped. DE 100 60 220 A1 describes counter track joints in which a first type of track pairs with an opening angle opening from the aperture end towards the first attaching end have in each case a course of the center line which is extended in an S-shaped course at the end. That means that the center lines of the outer ball tracks of the first type of track pairs, towards the aperture end, curve outwards, and that the center lines of the first inner ball tracks, towards the aperture end, curve outwards. This S-shaped course of the ball tracks enables a greater bending of the joint because the balls moving towards the joint aperture when the joint is bent are still guided in the ball tracks over a larger bending range and can contribute to torque transmission. The present invention provides that such a routing of the center lines is to be combinable therewith, and is therefore included herein. A spiral-shaped course of a contact line, which is also possible according to the present invention, is, for example, described in DE 103 37 612 A1, with reference to a first type of track pairs. The present invention is therefore not limited to any other specific configuration of the course of the contact lines.

In an embodiment of the present invention, for each track pair of the first type, there is provided a track pair of the second type, whose course of the outer or inner center lines can, for example, be mirror-symmetrical with respect to the joint center plane.

In an embodiment of the present invention, the opening angle associated with the third type of pairs can, for example, be 0° in the straightened position. It can, for example, be 0° in all possible bent positions of the joint. The balls associated with such a track pairing are referred to as "neutral" balls by the person skilled in the art. The accommodation of such a ball into a multiple-ball cage window can, for example, bee provided because such balls are advantageous with regard to friction and the degree of efficiency due to the fact that they predominantly execute a rolling movement, and not a combination of rolling and sliding.

In an embodiment of the present invention, the center lines associated with the ball tracks of the third type of track pairs, i.e., the outer and inner center lines, can, for example, each be described by a circle, wherein the circle center associated with the circles is in each case positioned on the joint center plane. The circle center can, for example, be disposed on the intersection point of the joint center plane with the two longitudinal axes.

In an embodiment of the present invention, the balls, with respect to their association with the types of track pairs, can, for example, be disposed alternatingly in the circumferential direction, subject to a regular sequence.

In an embodiment of the present invention, the circumferentially outermost balls of each multiple-ball cage window can, for example, be associated with the first or second type of track pairs.

In this case, the ball associated with the third type of track pairs can, for example, be one of the inner balls, or the inner ball, of the respective multiple-ball cage window.

In an embodiment of the present invention, it is provided for the first type and the second type of the track pairs that, if the joint is bent to its maximum extent and is rotating, the associated opening angle can, for example, change continuously for a ball associated with these track pairs and moving along the course of the outer and inner center lines.

In an embodiment of the present invention, it is provided that, for the first type and the second type of the track pairs and for an associated ball moving along the course of the respective outer and inner center lines, the associated opening angle can, for example, maintain the respective overall direction of its opening if the joint is maximally bent and rotating. In other words, for the first type of the track pairs, the associated opening angle opens towards the first attaching end for all possible positions of the intersection point of the first and second center lines defining the possible position of the ball, which positions are, however, fundamentally dependent on the bending position of the joint, whereas for the second type of track pairs, the opening angle opens toward the aperture end for all possible positions. In other words, according to this embodiment, the opening angles of the track pairs of the first and second types at least maintain the overall direction of their opening due to the trajectory of the associated ball defined by the maximum extent of bending of the joint, and thus do not undergo a zero crossing with respect to their absolute value.

In an embodiment of the present invention, it is provided that, for at least one type from the first, second and third types of the track pairs and for an associated ball moving along the course of the respective outer and inner center lines, the associated opening angle can, for example, change the overall direction of its opening at least once, for example, at least once in a continuous manner, if the joint is maximally bent and rotating. This means that in qualitative terms, the opening angle, for example, for a first portion of the ball movement along the two center lines, is opened in the direction towards the first attaching end, and the angle is opened in the direction towards the aperture end for a portion following the first portion. In other words, a ball moving along the two center lines experiences a reversal of the axial forces acting upon it. The respective type of track pairs is, for example, configured so that the change of the opening of the opening angle takes place in the straightened position so that, considering the absolute value of the opening angle, the latter undergoes a zero crossing in the straightened state of the joint when, for example, passing through the center lines.

In an embodiment of the present invention, the inner and outer contact lines associated with the ball tracks of the first and second types of track pairs can, for example, each be described by a curvature at least in some portions, and, for example, by a circular curvature, wherein, for the first type of track pairs, a center of curvature describing the curvature of the outer contact line is positioned offset relative to the joint center plane in the direction towards the first aperture end, and a center of curvature describing the curvature of the inner contact line is positioned offset relative to the joint center plane in the direction towards the second attaching end, and wherein, for the second type of track pairs, a center of curvature describing the curvature of the outer contact line is positioned offset relative to the joint center plane in the direction towards the first attaching end, and a center of curvature describing the curvature of the inner contact line is positioned offset relative to the joint center plane away from the second attaching end. The above-mentioned curved portion can, for example, include the straightened position of the joint.

The present invention as well as the technical environment will be explained in greater detail below under reference to the drawings. It must be understood that the drawings depict exemplary embodiments of the present invention, but that the present invention is not limited thereto.

An embodiment of the constant velocity joint 1 according to the present invention is shown in FIG. 1 and the associated longitudinal section along the two longitudinal axes La, Li of the joint of FIG. 2. It has a cup-shaped outer joint portion 2 and an inner joint portion 3. A number of nine balls 5a, 5b, 5c with an identical diameter, which are guided, on the one hand, in outer ball tracks 11a, 12a, 13a and, on the other hand, in inner ball tracks 11i, 12i, 13i, are disposed between the outer joint portion 2 and the inner joint portion 3. The outer ball tracks 11a, 12a, 13a are formed on an inner circumferential surface of the outer joint portion 2 and extend from the aperture end O towards a first attaching end A1 of the outer joint portion 2. The outer joint portion 2 forms a shaft journal 6 at its first attaching end A1. The inner joint portion 3 inserted into the hollow volume formed by the outer joint portion 2 respectively forms inner ball tracks 11i, 12i, 13i, which are opposite, in pairs, to the outer ball tracks 11a, 12a, 13a, accommodating one ball 5a, 5b, 5c in each case. The inner joint portion 3 forms an axle-accommodating portion 7. If used as intended, the outer joint portion 3 rotates about a first longitudinal axis La, and the inner joint portion 3 correspondingly rotates about a second inner joint portion Li. Due to the ball tracks being shaped differently, particularly in the axial direction, all pairings of an outer ball track 11a, 12a, 13a and an inner ball track 11i, 12i, 13i formed by their being situated opposite to each other in space can be divided into three types of track pairs, which are hereinafter referred to as the first type of track pairs 11a, 11i, as the second type of track pairs 12a, 12i and as the third pair of track pairs 13a, 13i. The balls disposed in the respective type of track pairs are referred to in a different manner only due to this association, and not due to a difference in design, wherein the ball associated with the first type 11a, 11i of track pair and located in that type of track pair is denoted 5a, the ball associated with the second type of track pair 12a, 12i is denoted 5b, and the ball associated with the third type of track pair 13a, 13i is denoted 5c. The track pairing of one type does not differ, are therefore congruent and uniformly distributed in the circumferential direction; in this case, they are arranged offset from each other by 120° on the inner circumferential surface of the outer joint portion 2 or the outer circumferential surface of the inner joint portion 3. The balls 5a, 5b, 5c are retained in a common ball cage 4, wherein the centers of the balls 5a, 5b, 5c are retained in a common plane, the so-called joint center plane EM, which, when the joint is straightened, is perpendicular to the first longitudinal axis La and the second longitudinal axis Li. If the joint 1 is bent, as shown in the FIGS. 8, 10 and 12, which show the joint in a bent state, the joint center plane EM corresponds to an angle-bisecting plane between the first longitudinal axis La and second longitudinal axis Li.

Figures 5, 6:
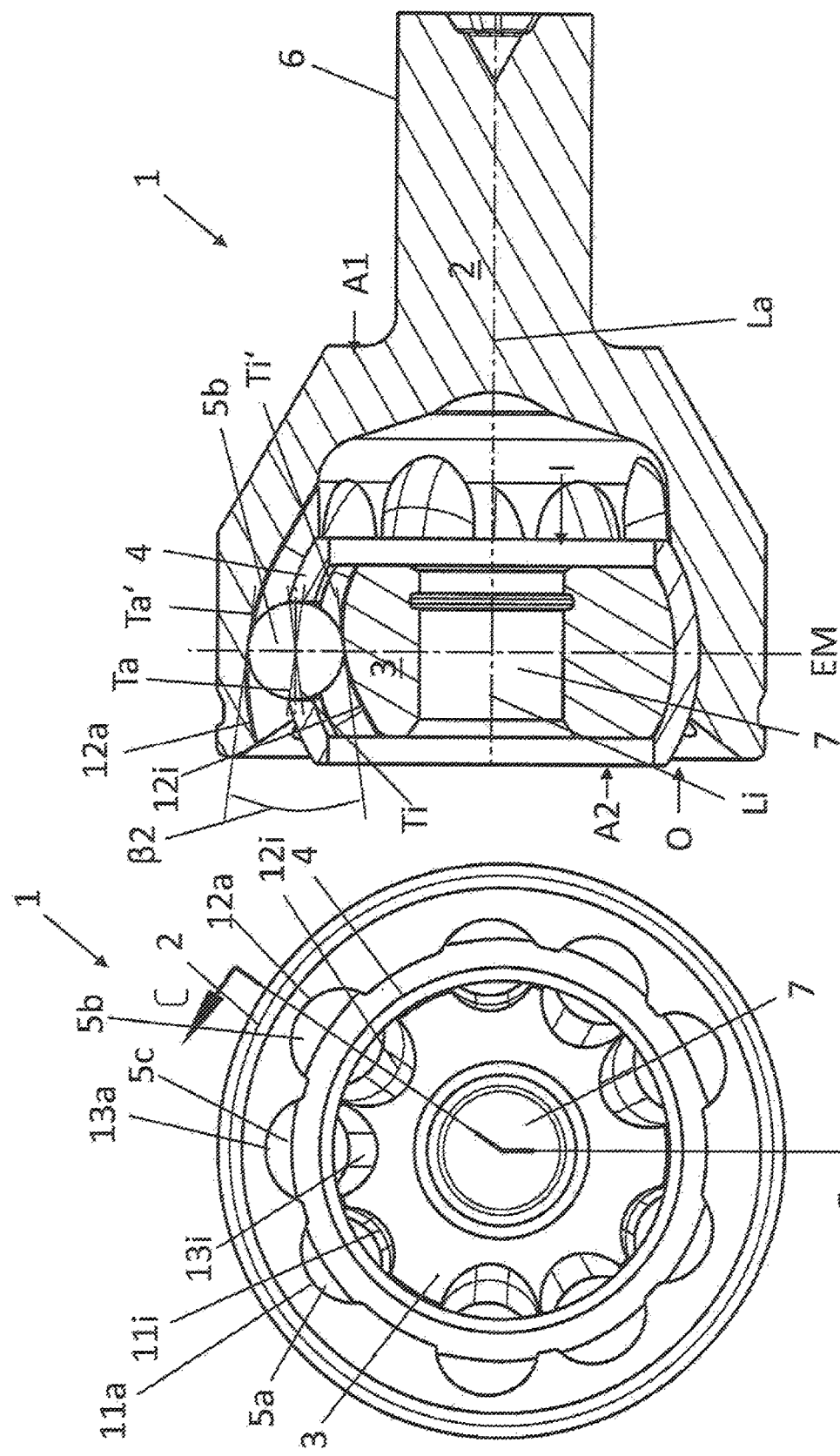
FIG. 5 shows a view corresponding to FIGS. 1 and 3 with the labeled line of cut C-C.
FIG. 6 shows a sectional view of the embodiment from FIG. 1 along the line of cut C-C from FIG. 5.
Figures 7, 8:
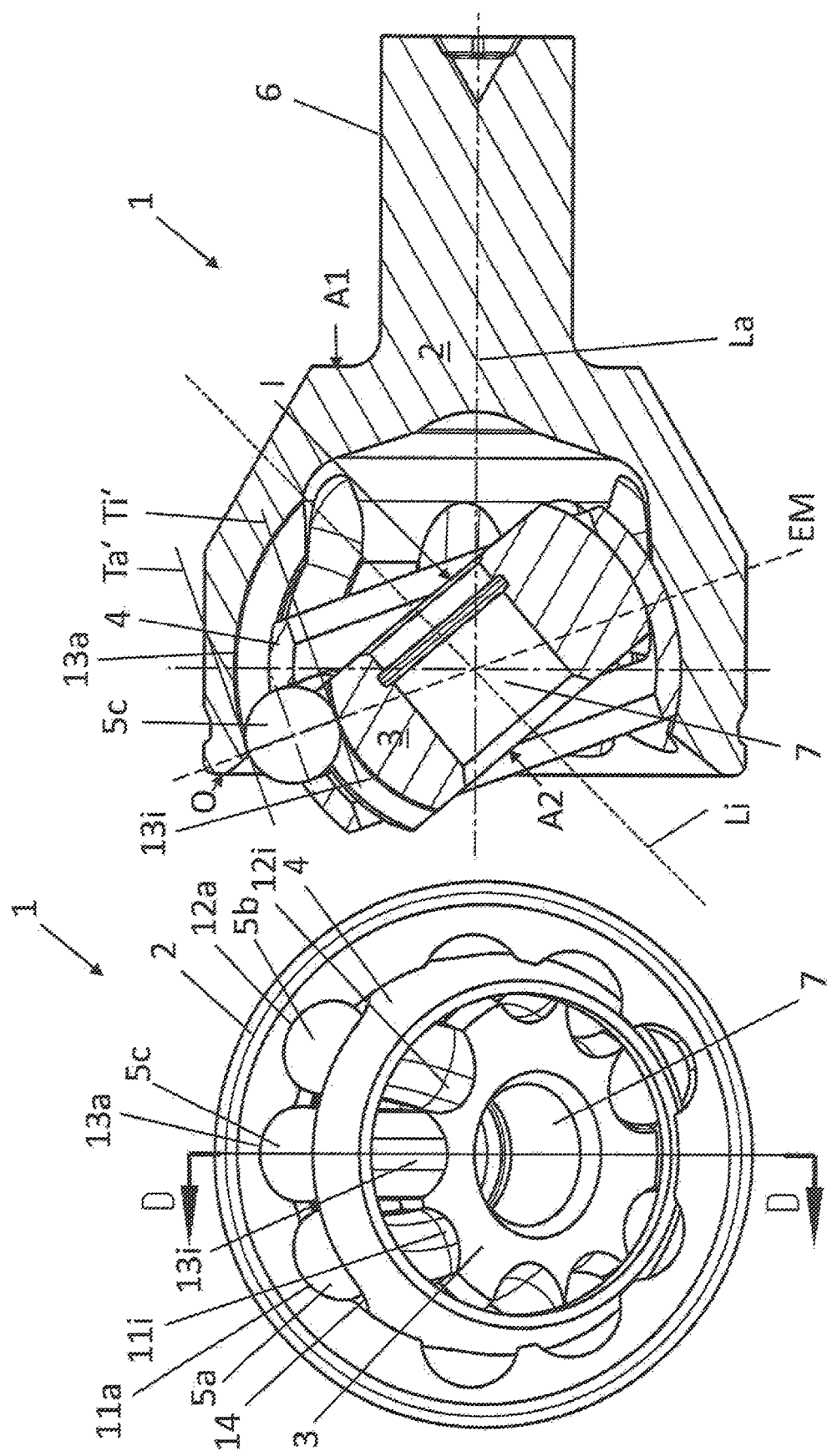
FIG. 7 shows a view corresponding to FIGS. 1, 3 and 5 with the labeled line of cut D-D, but in the bent position of the constant velocity joint 1.
FIG. 8 shows a sectional view of the embodiment from FIG. 1 along the line of cut D-D from FIG. 7.

The difference in design substantially characterizing the type of track pairs is to be illustrated based on the sectional views of the FIGS. 2, 4, and 6, wherein the joint is in the straightened position in each case, in which the first longitudinal axis La and the second longitudinal axis Li are aligned. For the sake of simplicity, but without limiting the present invention thereto, it should be assumed herein that the balls 5a, 5b, 5c in each case roll on a bottom line of the respective ball track and that thus, in the drawings, the course of the center line determined by the ball center corresponds to that of the respective bottom line, offset by the ball radius in a parallel direction. The depiction of the respective center line was therefore omitted for reasons of clarity. The configuration of the outer ball track 13a and the inner ball track 13i is explained in more detail hereinafter, with reference to FIG. 2. The contact line associated with the outer ball track 13a of the third type and the center line extending parallel thereto, and the contact line associated with the inner ball track 13i of the third type and the center line extending parallel thereto are each described by concentric circular trajectories whose circle centers are situated on the joint center plane EM in their intersection point with the first longitudinal axis Li and with the second longitudinal axis Li. The outer tangent to the outer center line in its intersection point with the joint center plane EM shown in FIG. 2 is referred to as Ta in FIG. 2, and is parallel to the tangent Ta' to the outer contact line of the outer ball track 13a. The inner tangent to the inner center line in its intersection point with the joint center plane EM is referred to as Ti in FIG. 2, and is parallel to the tangent Ti' to the inner contact line of the inner ball track 13i. The opening angle β3 for the straightened state is the angle included by the inner tangent Ti and the outer tangent Ta, which corresponds to the angle included by the tangent Ti' and Ta'. As is shown in FIG. 2, this angle is 0° for track pairs of the third type. Due to the concentric circular course of the center line, this angle, as is shown in FIG. 8, remains at an absolute value of 0° across the pivoting range. In other words, balls 5c associated with this third type of track pairing are not subjected to axial forces, neither in the straightened position, nor in the bent position of the joint 1, and are referred to as "neutral" balls in the general technical jargon.

Figures 9, 10:
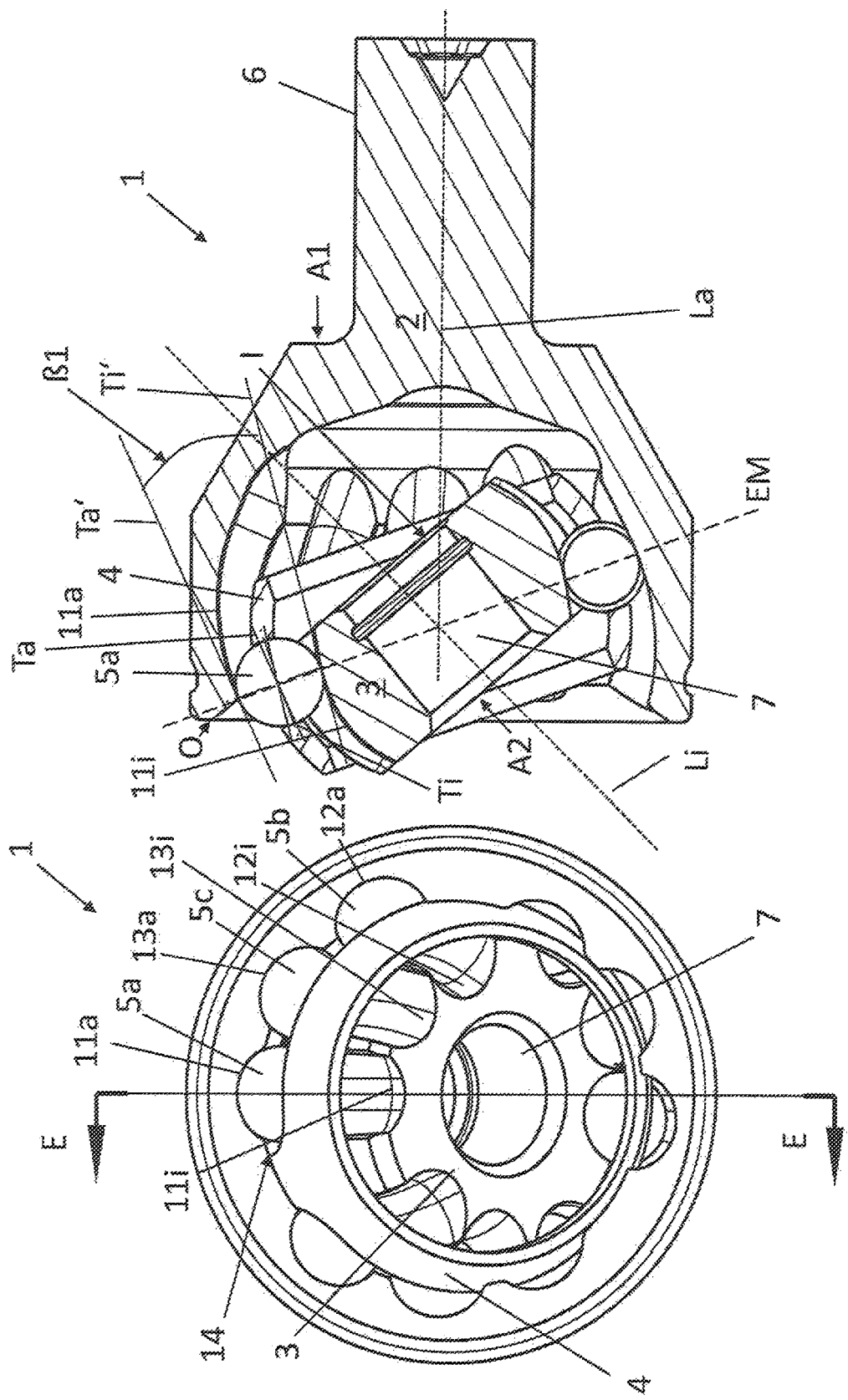
FIG. 9 shows a view corresponding to FIGS. 1, 3 and 5 with the labeled line of cut E-E, but in the bent position of the constant velocity joint 1.
FIG. 10 shows a sectional view of the embodiment from FIG. 1 along the line of cut E-E from FIG. 9.

FIG. 4 shows a section through a track pair of the first type of the outer ball track 11a and the inner ball track 11i. As was already mentioned, the joint 1 is shown in a straightened position. The contact line associated with the outer ball track 11a of the first type and the center line extending parallel thereto, and the contact line associated with the inner ball track 11i of the first type and the center line extending parallel thereto are each described by circular trajectories whose circle centers, however, are offset relative to the joint center plane EM in opposite directions on the respective longitudinal axis. In this case, the circle center of the center line associated with the inner ball track 11i and of the inner contact line parallel thereto is offset towards the second attaching end A2 of the inner joint portion 3, and the circle center of the center line associated with the outer ball track 11a and of the outer contact line parallel thereto is offset towards the first attaching end of the outer joint portion 2. The outer tangent to the outer center line in its intersection point with the joint center plane EM is referred to as Ta in FIG. 4, and is parallel to the tangent Ta' to the outer contact line of the outer ball track 11a. The inner tangent to the inner center line in its intersection point with the joint center plane EM is referred to as Ti in FIG. 4, and is parallel to the tangent Ti' to the inner contact line of the inner ball track 11i. The opening angle β1 for the straightened state is the angle included by the inner tangent Ti and the outer tangent Ta, which again corresponds to the angle included by the tangent Ti' and Ta'. As is shown in FIG. 4, this angle is greater than 0° for track pairs of the first type. Due to the course of the center lines being circular, but offset, this angle is opened from the aperture end O in the direction towards the first attaching end A1 in the straightened position for the track pairing of the first type 11a, 11i, and retains the overall direction of its opening, in this case in the direction towards the attaching end A1, across the pivoting range of the joint 1 from the straightened position into a position of being maximally bent, as the sectional view of FIG. 10 shows, which corresponds to the section along the line of cut E-E from FIG. 9. In other words, the associated balls 5a associated with this first type of track pairing are subjected to axial forces in all positions of the joint 1, and are referred to as "controlling" balls in the general technical jargon.

Figures 11, 12:
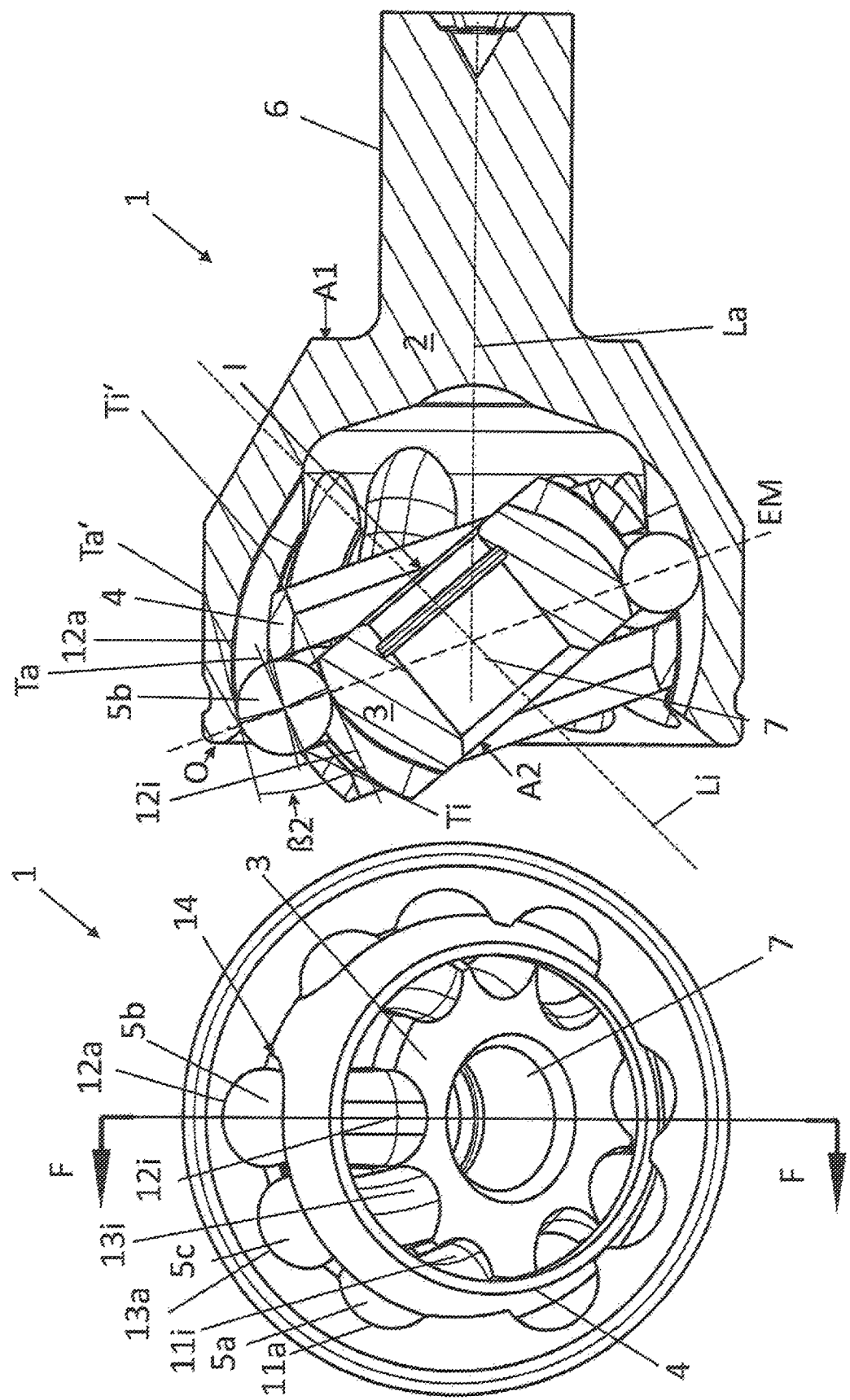
FIG. 11 shows a view corresponding to FIGS. 1, 3 and 5 with the labeled line of cut F-F, but in the bent position of the constant velocity joint 1.
FIG. 12 shows a sectional view of the embodiment from FIG. 1 along the line of cut F-F from FIG. 11.

FIG. 6 shows a section according to the line of cut C-C of FIG. 5 through a track pair of the second type of the outer ball track 12a and the inner ball track 12i. As was already mentioned, the joint 1 is shown in a straightened position. The contact line associated with the outer ball track 12a of the second type and the center line extending parallel thereto, and the contact line associated with the inner ball track 12i of the second type and the center line extending parallel thereto are each described by circular trajectories whose circle centers are again offset relative to the joint center plane EM in opposite directions on the respective longitudinal axis. In this case, the circle center of the center line associated with the inner ball track 12i and of the inner contact line parallel thereto is offset towards the inner face I of the inner joint portion 3 facing towards the outer joint portion 2, and the circle center of the center line associated with the outer ball track 12a and of the outer contact line parallel thereto is offset towards the aperture end O of the outer joint portion 2. The outer tangent to the outer center line in its intersection point with the joint center plane EM is referred to as Ta in FIG. 6, and is parallel to the tangent Ta' to the outer contact line of the outer ball track 12a. The inner tangent to the inner center line in its intersection point with the joint center plane EM is referred to as Ti in FIG. 6, and is parallel to the tangent Ti' to the inner contact line of the inner ball track 11i. The opening angle β2 for the straightened state is the angle included by the inner tangent Ti and the outer tangent Ta, or by the tangent Ta' and Ti'. As is shown in FIG. 6, this angle is again greater than 0° for track pairs of the second type. Due to the course of the center lines being circular, but offset, this angle is opened from the first attaching end A1 in the direction towards the opening end O in the straightened position for the track pairing of the second type 12a, 12i. The overall direction of the opening of the opening angle β2, in this case in the direction towards the aperture end O, is retained also in this case across the pivoting range of the joint 1 from the straightened position into a position of being maximally bent, as the sectional view in FIG. 12 shows, which corresponds to a section along the line of cut F-F from FIG. 11. The direction of the opening for this second type is, in principle, thus the reverse of that of the first type. In other words, the associated balls 5b associated with this second type of track pairing are subjected to axial forces in all positions of the joint 1, and are also referred to as "controlling" balls in the general technical jargon, wherein the axial forces acting on the balls 5b associated with the second type are opposite to those of the balls 5a associated with the first type of track pairs.

Figure 14:
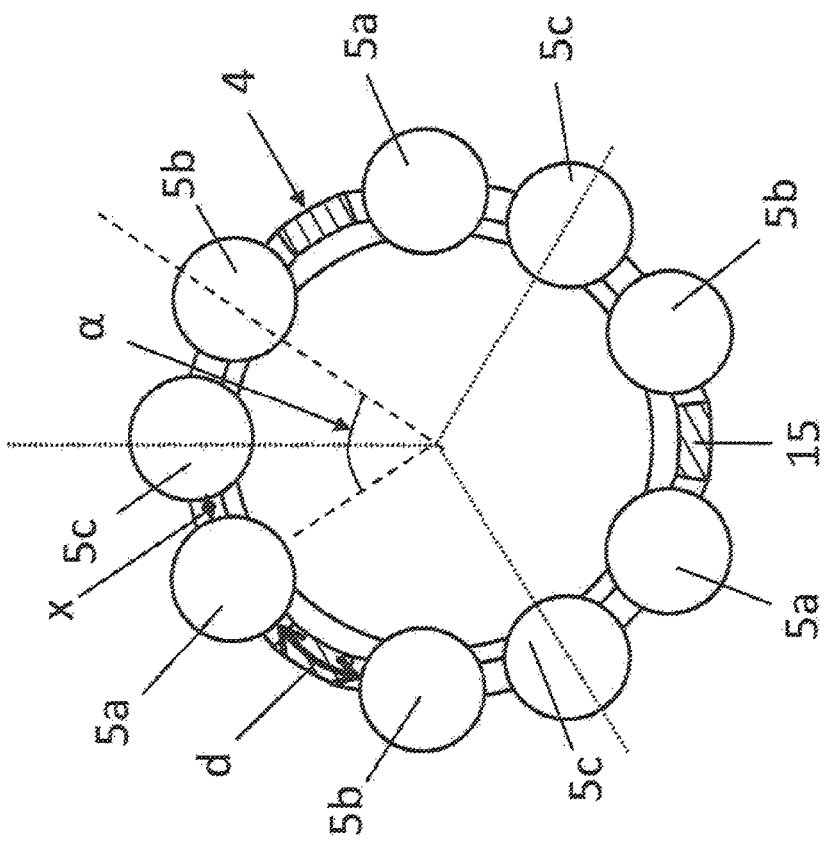
FIG. 14 shows a sectional view according to the line of cut G-G in FIG. 13 of the ball cage 4 associated with the embodiment of FIG. 1, with the balls 5a, 5b, 5c guided therein.
Figure 13:
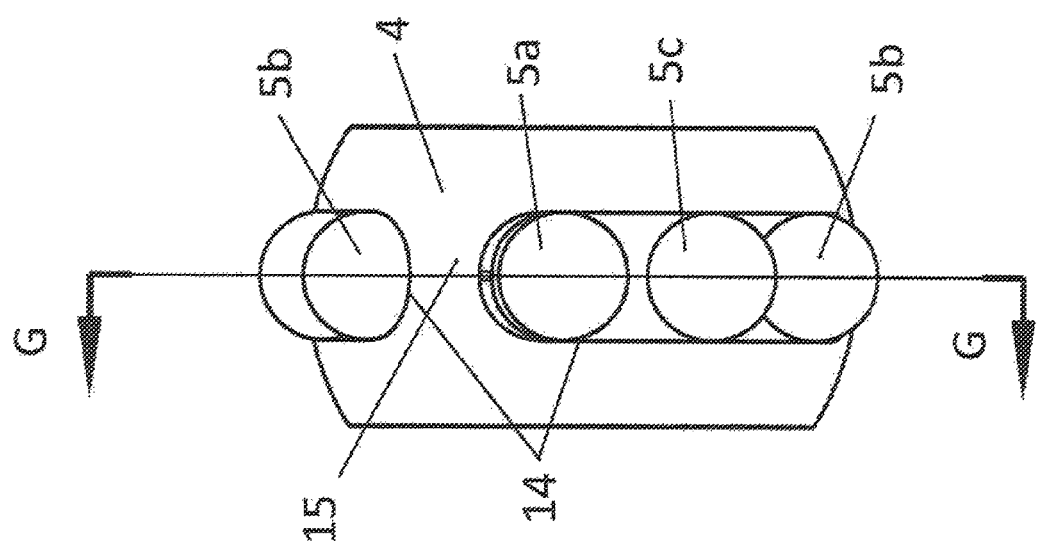
FIG. 13 shows a view of the ball cage 4 associated with the embodiment of FIG. 1, with the balls 5a, 5b, 5c guided therein, in the radial direction.

The arrangement of these balls 5a, 5b, 5c, which differ due to their being associated with geometrically different types of track pairs, within the ball cage 4 is described with reference to FIGS. 13 and 14, without these balls being different in design in the present embodiment. For the sake of convenience, these balls will hereinafter be referred to as first balls 5a, second balls 5b and third balls 5c based on their association, wherein the latter are the "neutral" balls. A total of nine balls 5a, 5b, 5c are guided in the cage 4 of the joint from FIG. 1. The annular cage 4 has three cage windows 14 uniformly distributed in the circumferential direction, in each of which three balls, a first ball 5a, a second ball 5b and a third ball 5c, are accommodated and guided together, and which are therefore referred to as multiple-ball cage windows. As is shown in FIG. 2, the balls, with regard to their association with the types of track pairs, are disposed alternatingly in a regular sequence in the circumferential direction, i.e., the sequence of the balls is identical in each multiple-ball cage window 14 in one circulating direction. Due to the arrangement of the tracks, the centers of the balls of one type, i.e., if considering purely a single type, are offset from one another by about 120°. In this case, the controlling balls, i.e., the first balls 5a and the second balls 5b, form the outer balls of the respective multiple-ball cage window 14. In order to be able to maximize the webs 15 between the cage windows 14, the maximum possible clear angular distance X between the balls 5a, 5b, 5c, of which only one is drawn in in FIG. 14 by way of example, of each multiple-ball cage window 14 is minimized in such a way, due to a suitable selection of the ball diameters and the relative position of the associated ball tracks in the inner joint portion 3 and outer joint portion 2, that the distance d of the outer balls 5a, 5b from the respective next ball in the closest adjacent multiple-ball cage window 14 is maximized. The balls are dimensioned and the arrangement of the inner and outer tracks is selected so that the centers of the outer balls 5a, 5b of each multiple-ball cage window 14 are disposed within an arc length proportional to the angle of α (alpha), wherein the absolute value of the latter does not exceed 34° in this embodiment.

It must be noted that the features cited individually in the present invention can be combined with each other in any technologically meaningful manner and represent other embodiments of the present invention. The description, in particular in connection with the drawings, additionally characterizes and specifies the present invention. Reference should also be had to the appended claims.

What is claimed is:

1. A constant velocity joint comprising:
    an outer joint portion comprising a first longitudinal axis, a first attaching end, an aperture end, and outer ball tracks which are arranged on an inner circumferential surface, the first attaching end and the aperture end being arranged axially opposite to each other;
    an inner joint portion comprising a second longitudinal axis, a second attaching end, an inner face which is arranged to face towards the outer joint portion, and inner ball tracks which are arranged on an outer circumferential surface, the second attaching end and the inner face being arranged axially opposite to each other;
    a plurality of balls to transmit torque between the outer joint portion and the inner joint portion; and
    an annular ball cage arranged between the inner joint portion and the outer joint portion, the annular ball cage comprising cage windows which are arranged in a circumferential direction, the plurality of balls being guided in the cage windows,
    wherein,
    the inner joint portion and the outer joint portion are arranged so that one of the outer ball tracks and one of the inner ball tracks are in each case arranged opposite to each other so as to form three different types of track pairs comprising a first type of track pair, a second type of track pair, and a third type of track pair, each of which are configured to receive one of the plurality of balls,
    when the constant velocity joint is bent, the plurality of balls each run along an outer center line prescribed by the respectively associated outer ball track and defined by a center of a respective ball of the plurality of balls and along an inner center line prescribed by the respectively associated inner ball track and defined by the center of the respective ball of the plurality of balls,
    the plurality of balls are guided by the annular ball cage so that, when the constant velocity joint is straightened, the respective centers of the plurality of balls are guided by the annular ball cage in a common joint center plane which, when the constant velocity joint is straightened, is perpendicular to the first longitudinal axis and to the second longitudinal axis and, when the constant velocity joint is bent, corresponds to an angle-bisecting plane between the first longitudinal axis and to the second longitudinal axis,
    a position of the constant velocity joint creates an opening angle which is defined by an outer tangent to the outer center line in an intersection point thereof with the joint center plane and by an inner tangent to the inner center line in the intersection point thereof with the joint center plane,
    at least in a straightened position of the constant velocity joint,
        the opening angle for the first type of the track pairs opens toward the first attaching end,
        the opening angle for the second type of the track pairs opens toward the aperture end, and
        the opening angle for the third type of the track pairs is less than each of the opening angle for the first type of track pairs and the opening angle for second type of track pairs, and
    the annular ball cage comprises at least one cage window in which are arranged together at least one ball of the plurality of balls associated with the first type of track pairs, at least one ball of the plurality of balls associated with the second type of track pairs, and at least one ball of the plurality of balls associated with the third type of track pairs.

2. The constant velocity joint as recited by claim 1, wherein each of the at least one cage windows is provided as a multiple-ball cage window.

3. The constant velocity joint as recited in claim 2, wherein an angular distance in the circumferential direction between balls of the plurality of balls which are most closely adjacent to each other in each multiple-ball cage window that is the largest possible for all bent positions is smaller than the angular distance of the outermost balls of the plurality of balls in two most closely adjacent multiple-ball cage windows.

4. The constant velocity joint as recited in claim 2, wherein the balls of the plurality of balls which are arranged circumferentially outermost in each multiple-ball cage window are associated with the first type of track pairs or with the second type of track pairs.

5. The constant velocity joint as recited in claim 1, wherein the opening angle associated with the third type of track pairs is 0° in the straightened position.

6. The constant velocity joint as recited in claim 1, wherein the opening angle associated with the third type of track pairs is 0° in all possible bent positions.

7. The constant velocity joint as recited in claim 1, wherein, the outer center line and the inner center line associated with the respective outer ball tracks and inner ball tracks of the third type of track pairs are each defined by a circle, and a center associated with the respective circle is in each case positioned on the joint center plane.

8. The constant velocity joint as recited in claim 1, wherein the plurality of balls, with respect to their association in the three different types of track pairs, are disposed alternatingly in a regular sequence in the circumferential direction.

9. The constant velocity joint as recited in claim 1, wherein for the first type of track pairs, for the second type of the track pairs, and for an associated ball of the plurality of balls moving along a course of the respective outer center line and the inner center line, the associated opening angle changes continuously with respect to its absolute value when the constant velocity joint is maximally bent and rotating.

10. The constant velocity joint as recited in claim 1, wherein for the first type of track pairs, for the second type of the track pairs, and for an associated ball of the plurality of balls moving along a course of the respective outer center line and the inner center line, the associated opening angle maintains a respective direction of its opening when the constant velocity joint is maximally bent and rotating.

11. The constant velocity joint as recited in claim 1, wherein for at least one of the first type of track pairs, the second type of track pairs and the third types of the track pairs, and for an associated ball of the plurality of balls moving along a course of the respective outer center line and the inner center line, the associated opening angle changes a direction of its opening at least once when the constant velocity joint is maximally bent and rotating.

12. The constant velocity joint as recited in claim 1, wherein, the inner center line and the outer center line associated with the respective outer ball track and inner ball track of the first type of ball track pair and the second types of track pair are each described by a curvature at least in portions, for the first type of track pairs, a center of curvature describing the curvature of the outer center line is positioned offset relative to the joint center plane in a direction towards the first attaching end, and a center of curvature describing the curvature of the inner center line is positioned offset relative to the joint center plane in a direction towards the second attaching end, and for the second type of track pairs, a center of curvature describing the curvature of the outer center line is positioned offset relative to the joint center plane in the direction towards the aperture end, and a center of curvature describing the curvature of the inner center line is positioned offset relative to the joint center plane in the direction towards the inner face.

13. The constant velocity joint as recited in claim 1, wherein, each outer center line is configured to extend in a radial plane of the first longitudinal axis, and each inner center line is configured to extend in a radial plane of the second longitudinal axis.

* * * * *